(12) United States Patent
Wang et al.

(10) Patent No.: US 10,739,642 B2
(45) Date of Patent: Aug. 11, 2020

(54) PIXEL STRUCTURE, LIQUID CRYSTAL DISPLAY PANEL, OPERATING METHOD OF THE SAME, AND DISPLAY DEVICE

(71) Applicant: BOE TECHNOLOGY GROUP CO., LTD., Beijing (CN)

(72) Inventors: Guoqiang Wang, Beijing (CN); Qingzhao Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/569,639

(22) Filed: Sep. 12, 2019

(65) Prior Publication Data

US 2020/0089061 A1  Mar. 19, 2020

(30) Foreign Application Priority Data

Sep. 18, 2018 (CN) .......................... 2018 1 1086505

(51) Int. Cl.
*G02F 1/13363* (2006.01)
*G02F 1/1335* (2006.01)

(52) U.S. Cl.
CPC .. *G02F 1/133636* (2013.01); *G02F 1/133514* (2013.01); *G02F 1/133528* (2013.01); *G02F 2203/07* (2013.01); *G02F 2413/15* (2013.01)

(58) Field of Classification Search
CPC ................................................. G02F 1/133636
See application file for complete search history.

(56) References Cited

U.S. PATENT DOCUMENTS 8,861,063 B2 * 10/2014 Matsuura ................ G02F 1/061
359/246
2011/0304827 A1 * 12/2011 Itoh .................... G03B 21/2073
353/20

* cited by examiner

*Primary Examiner* — Edmond C Lau
(74) *Attorney, Agent, or Firm* — Kinney & Lange, P.A.

(57) ABSTRACT

A pixel structure, a liquid crystal display panel, a method of operating the liquid crystal display panel, and a display device are disclosed. The pixel structure includes a light shutter for switching between first and second states, wherein in the first and second states, the light shutter only allows first polarized light having a first polarization direction and second polarized light having a second polarization direction to pass, respectively; a birefringent filter for causing emergent paths of the first and second polarized light to be first and second paths, respectively; a first liquid crystal unit and a first color filter in the first path and corresponding to a first sub-pixel region, wherein the first color filter is at a light-emergent side of the first liquid crystal unit; and a second liquid crystal unit in the second path and corresponding to a second sub-pixel region.

13 Claims, 3 Drawing Sheets

PIXEL STRUCTURE, LIQUID CRYSTAL DISPLAY PANEL, OPERATING METHOD OF THE SAME, AND DISPLAY DEVICE

CROSS-REFERENCE TO RELATED APPLICATION

This application claims a priority to Chinese patent application No. 201811086505.9 filed in China on Sep. 18, 2018, the disclosure of which is incorporated herein by reference in its entirety.

TECHNICAL FIELD

The present disclosure relates to the field of display technology, and in particular, relates to a pixel structure, a liquid crystal display panel, an operating method of the liquid crystal display panel, and a display device.

BACKGROUND

Light transmittance of a screen is an important parameter that affects brightness, contrast, and other characteristics of the screen. High transmittance makes a displayed color brighter and more realistic.

SUMMARY

The embodiments of the present disclosure provide a pixel structure, a liquid crystal display panel, and a method of operating the liquid crystal display panel and a display device.

In a first aspect, a pixel structure is provided in the present disclosure. The pixel structure is applied to a pixel region. The pixel structure includes a light shutter, configured to switch between a first state and a second state, wherein in the first state, the light shutter only allows first polarized light incident onto the light shutter and having a first polarization direction to pass through the light shutter, and in the second state, the light shutter only allows second polarized light incident onto the light shutter and having a second polarization direction to pass through the light shutter, the first polarization direction is perpendicular to the second polarization direction; a birefringent filter, at a light-emergent side of the light shutter and configured to cause an emergent path of the first polarized light perpendicularly incident onto the birefringent filter to be a first path, and to cause an emergent path of the second polarized light perpendicularly incident onto the birefringent filter to be a second path, wherein the first path is different from the second path; a first liquid crystal unit and a first color filter at a light-emergent side of the birefringent filter and arranged to correspond to a first sub-pixel region of the pixel region, wherein the first liquid crystal unit is in the first path, the first color filter is at a light-emergent side of the first liquid crystal unit; and a second liquid crystal unit at a light-emergent side of the birefringent filter and arranged to correspond to a second sub-pixel region of the pixel region, wherein the second liquid crystal unit is in the second path.

Optionally, the pixel structure further includes: a first polarizer, at the light-emergent side of the first liquid crystal unit and configured to allow only the first polarized light to pass; and/or a second polarizer, at a light-emergent side of the second liquid crystal unit and configured to allow only the second polarized light to pass.

Optionally, an area of the first sub-pixel region and an area of the second sub-pixel region are same.

Optionally, the first path is consistent with an incident path of the first polarized light, and a distance between the second path and the first path is a half of a width of the pixel region.

Optionally, the pixel structure further includes: a second color filter, at a light-emergent side of the second liquid crystal unit, wherein the first color filter and the second color filter allow monochromatic light having a same color to pass; or the first color filter allows monochromatic light to pass, the second color filter allows white light to pass.

Optionally, an area of a light-emergent opening of the light shutter is greater than or equal to an area of the first color filter; and/or an area of a light-emergent opening of the birefringent filter is greater than or equal to the area of the first color filter.

Optionally the light shutter is formed by a Twisted Nematic (TN) type liquid crystal unit.

In a second aspect, a liquid crystal display panel is provided in the present disclosure. The liquid crystal display panel includes a plurality of pixel regions, wherein each of the plurality of pixel regions comprises the pixel structure according to the first aspect.

In a third aspect, a display device is provided in the present disclosure. The display device includes the liquid crystal display panel according to claim the second aspect; and a white backlight at a light-incident side of the liquid crystal display panel.

In a fourth aspect, a method of operating a liquid crystal display panel is provided in the present disclosure. The liquid crystal display panel is the liquid crystal display panel according to the second aspect, the method includes: controlling the light shutter to switch between the first state and the second state, and controlling a deflection angle of a liquid crystal molecule in the first liquid crystal unit and the second liquid crystal unit, so as to control display brightness of each of the plurality of pixel regions.

Optionally, the method of operating the liquid crystal display panel further include: controlling the light shutter to be in a first state, controlling the first liquid crystal unit to allow the first polarized light to pass, so that the first sub-pixel region displays a bright state, and the second sub-pixel region displays a dark state; controlling the light shutter to be in the first state and controlling the first liquid crystal unit to not allow the first polarized light to pass, or controlling the light shutter to be in a second state and controlling the second liquid crystal unit to not allow the second polarized light to pass, so that the first sub-pixel region displays a dark state, and the second sub-pixel region displays the dark state; controlling the light shutter to be in a second state and controlling the second liquid crystal unit to allow the second polarized light to pass, so that the first sub-pixel region displays the dark state, and the second sub-pixel region displays a bright state.

Optionally, the method of operating the liquid crystal display panel specifically includes: controlling the light shutter to be in a first state, controlling the first liquid crystal unit to allow the first polarized light to pass, controlling the second liquid crystal unit to allow the second polarized light to pass, so that the first sub-pixel region displays a bright state, and the second sub-pixel region displays a dark state; controlling the light shutter to be in the first state, controlling the first liquid crystal unit to allow the first polarized light to pass, controlling the second liquid crystal unit to not allow the second polarized light to pass, so that the first sub-pixel region displays the bright state, and the second sub-pixel region displays the dark state; controlling the light shutter to be in the first state, controlling the first liquid crystal unit to not allow the first polarized light to pass, and controlling the second liquid crystal unit to allow the second polarized light to pass, so that both the first sub-pixel region and the second sub-pixel region display the dark state; controlling the light shutter to be in the first state, controlling the first liquid crystal unit to not allow the first polarized light to pass, and controlling the second liquid crystal unit to not allow the second polarized light to pass, so that both the first sub-pixel region and the second sub-pixel region display the dark state; controlling the light shutter to be in a second state, controlling the first liquid crystal unit to allow the first polarized light to pass, and controlling the second liquid crystal unit to allow the second polarized light to pass, so that the first sub-pixel region displays the dark state and the second sub-pixel region displays a bright state; controlling the light shutter to be in the second state, controlling the first liquid crystal unit to allow the first polarized light to pass, and controlling the second liquid crystal unit to not allow the second polarized light to pass, so that both the first sub-pixel region and the second sub-pixel region displays the dark state; controlling the light shutter to be in the second state, controlling the first liquid crystal unit to note allow the first polarized light to pass, and controlling the second liquid crystal unit to allow the second polarized light to pass, so that the first sub-pixel region displays the dark state and the second sub-pixel region displays the bright state; controlling the light shutter to be in the second state, controlling the first liquid crystal unit to not allow the first polarized light to pass, and controlling the second liquid crystal unit to not allow the second polarized light to pass, so that both the first sub-pixel region and the second sub-pixel region displays the dark state.

Optionally, controlling the light shutter to switch between the first state and the second state, includes: controlling the light shutter to switch between the first state and the second state at a frequency larger than 120 Hz.

DETAILED DESCRIPTION

Figure 1:
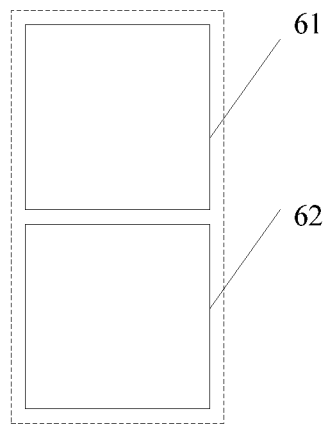
FIG. 1 is a schematic diagram of a pixel region being divided into two parts in some embodiments of the present disclosure.

In order to make technical problems, technical solutions, and advantages of the present invention clearer, the present disclosure will be described in details in conjunction with accompanying drawings and specific embodiments.

Light transmittance of a related liquid crystal display panel is low. A related method of increasing the transmittance includes a manner of increasing an aperture ratio of the liquid crystal display panel or a manner of increasing brightness of a backlight source, both of the two manner will sacrifice a contrast and increase power consumption of the liquid crystal display panel.

Some embodiments of the present disclosure provide a pixel structure, a liquid crystal display panel, a display device, and an operating method of the liquid crystal display panel. The present disclosure may improve the light transmittance and the contrast of a liquid crystal display panel without increasing power consumption thereof.

Some embodiments of the present disclosure provide a pixel structure. The pixel structure is applied to a pixel region. The pixel structure includes: a light shutter, configured to switch between a first state and a second state, wherein, in the first state, the light shutter allows only a first polarized light beam incident on the light shutter and having a first polarization direction to pass, and in the second state, the light shutter only allows a second polarized light beam incident on the light shutter and having a second polarization direction to pass, and the first polarization direction is perpendicular to the second polarization direction; a birefringent filter, arranged at a light-emergent side of the light shutter and configured to cause an emergent path of the first polarized light beam perpendicularly incident onto the birefringent filter to be a first path and cause an emergent path of the second polarized light beam perpendicularly incident onto the birefringent filter to be a second path different from the first path; a first liquid crystal unit and a first color filter arranged at a light-emergent side of the birefringent filter, wherein the first liquid crystal unit and the first color filter are arranged to correspond to a first sub-pixel region of the pixel region, the first liquid crystal unit is arranged in the first path, the first color filter is arranged at a light-emergent side of the first liquid crystal unit; a second liquid crystal unit arranged at a light-emergent side of the birefringent filter, the second liquid crystal unit is disposed to correspond to a second sub-pixel region of the pixel region, the second liquid crystal unit is arranged in the second path.

In some embodiments of the present disclosure, the light shutter and the birefringent filter are added in the pixel structure of each pixel region, and the light shutter may control polarized light beams having different polarization directions to pass, refractive indices of the birefringent filter to the light beams having different polarization directions are different, so that the first polarized light beam having the first polarization direction may exit along the first path, and the second polarized light beam having the second polarization direction may exit along the second path. For example, the birefringent filter may not change an emergent path of the first polarized light beam having the first polarization direction, and may change an emergent path of the second polarized light beam having the second polarization direction, such that the second polarized light beam exits along a different emergent path. The liquid crystal unit capable of causing the first polarized light beam to be emergent is disposed in the emergent path of the first polarized light beam and the liquid crystal unit capable of causing the second polarized light beam to be emergent is disposed in the emergent path of the second polarized light beam. In this way, when the light shutter is switched between the states at a higher frequency, the polarized light beams having the two polarization directions may be ensured to be emitted from the pixel region in a display period, and thus, more light may be emitted from this pixel region, and the light transmittance of the pixel region may be increased. Compared with the related pixel structure, when bright-state display is performed by the pixel structure in the present disclosure, a displayed brightness may be greatly increased; and when dark-sate display is performed, a displayed brightness remains unchanged, and thus a contrast of the liquid crystal display panel may be improved.

The first polarized light beam is one of a horizontally polarized light beam having a horizontal polarization direction or a vertically polarized light beam having a vertical polarization direction, and the second polarized light beam is the other of the horizontally polarized light beam or the vertically polarized light beam. Specifically, the first polarized light beam is the horizontally polarized light beam, and the second polarized light beam is the vertically polarized light beam.

The birefringent filter is made of a birefringent material, which is a crystal material having different refractive indices for the horizontally polarized light beam and the vertically polarized light beam. After an incident light beam passes through the birefringent filter, two refracted beams are generated. When light propagates in a heterogeneous medium, a propagation velocity of the light and a refractive index value change with a vibration direction being changed, and values of refractive indices of the heterogeneous medium are more than one. When light enters the heterogeneous medium, birefringence occurs; except a special direction, the light is decomposed to be two kinds of polarized light beams having vibration directions perpendicular to each other, different propagation speeds, and different refractive indices. The birefringent material forming the birefringent filter in some embodiments of the present disclosure may prevent the horizontally polarized light beam from being refracted when the light is incident perpendicularly onto the birefringent filter; and the vertically polarized light beam may be refracted at a certain angle, and the vertically polarized light beam being refracted and the horizontally polarized light beam are not coincident, the emergent path of the horizontally polarized light beam is unchanged, and the emergent path of the vertically polarized light beam will shift.

Optionally, the birefringent material forming the birefringent filter in some embodiments of the present disclosure may further direct the emergent path of the horizontally polarized light beam to a first path and the emergent path of the second polarized light beam to be a second path different from the first path when the light is incident vertically onto the birefringent filter.

Further, the pixel structure further includes: a first polarizer arranged at a light-emergent side of the first liquid crystal unit, wherein the first polarizer is configured to only allow the first polarized light beam to pass, such that the first polarizer may filter out polarized light beams other than the first polarized light beam; and/or a second polarizer arranged at a light-emergent side of the second liquid crystal unit, wherein the second polarizer is configured to only allow the second polarized light beam to pass, such that the second polarizer may filter out polarized light beams other than the second polarized light beam.

Further, the pixel structure further includes a second color filter arranged at a light-emergent side of the second liquid crystal unit. The first color filter and the second color filter allow monochromatic light of the same color to pass through, so that the first sub-pixel region and the second sub-pixel region emit light having the same color, a color displayed in the pixel region is more vivid.

Optionally, the first color filter allows monochromatic light to pass through, and the second color filter allows white light to pass through, such that the first sub-pixel region emits the monochromatic light, and the second sub-pixel region emits white light, such that a brightness of the pixel region is higher.

Optionally, the first polarizer is arranged between the first liquid crystal unit and the first color filter, and the second polarizer is arranged between the second liquid crystal unit and the second color filter.

Brightness of the first polarized light beam incident in the first sub-pixel region is substantially the same as brightness of the second polarized light beam incident in the second sub-pixel region. Optionally, an area of the first sub-pixel region and an area of the second sub-pixel region are equal, such that light outputted from the liquid crystal display panel is uniform, and uniformity of the liquid crystal display panel is improved.

Further, a distance between the emergent path (i.e., the second path) of the second polarized light beam and the emergent path (i.e., the first path) of the first polarized light beam is a half of a width of the pixel region. Thus, by adjusting a position of the light shutter, a center of the first polarized light beam exiting the birefringent filter may coincide with a center of the first sub-pixel region, and a center of the second polarized light beam exiting the birefringent filter may coincide with a center of the second sub-pixel region, thereby ensuring the brightness of the light exiting the pixel region.

Further, in order to ensure incident light to be completely utilized, an area of a light-emergent opening of the light shutter is not less than an area of the first color filter.

Specifically, the light shutter may be a twisted-nematic (TN) type liquid crystal unit. Of course, the light shutter is not limited to the twisted-nematic (TN) type liquid crystal unit, as long as the light shutter may be switched between two states; in one of the two states only the first polarized light beam is allowed to pass, and in the other of the two states, only the second polarized light beam is allowed to pass.

Some embodiments of the present disclosure also provide a liquid crystal display panel. The liquid crystal display panel includes a plurality of pixel regions, each of which includes the aforementioned pixel structure.

Some embodiments of the present disclosure also provide a display device. The display device includes the liquid crystal display panel as described above, and further includes a white backlight source arranged at a light-incident side of the liquid crystal display panel. The display device may be any product or component having a display function, such as a liquid crystal television, a liquid crystal display, a digital photo frame, a mobile phone, a tablet computer, etc., wherein the display device further includes a flexible circuit board, a printed circuit board, and a backboard.

In some embodiments of the present disclosure, the light shutter and the birefringent filter are added in the liquid crystal display panel, and the light shutter may control polarized light beams having different polarization directions to pass, and refractive indices of birefringent filter to light beams having different polarization directions are different, and the emergent path of the first polarized light beam having the first polarization direction may not be changed and the emergent path of the second polarized light beam having the second polarization direction may be changed such that the second polarized light beam exits on the other emergent path, and the liquid crystal unit capable of causing the first polarized light beam to be emitted is arranged in the emergent path of the first polarized light beam, and a liquid crystal unit capable of causing the second polarized light beam be emitted is arranged in the emergent path of the second polarized light beam, so that when the light shutter is switched between the states at a higher frequency, it may be ensured that the polarized light beams having both polarization directions may be emitted from the liquid crystal display panel in a display period, the liquid crystal display panel outputs more light, thereby improving the light transmittance of the display device. Compared with the related liquid crystal display panel, when the bright-state display is performed, the brightness of the display may be greatly increased, and when the dark-state display is performed, the brightness remains unchanged, and thus a contrast of the display device may be improved.

Some embodiments of the present disclosure further provide an operating method of a liquid crystal display panel. The operating method is applied to the liquid crystal display panel as described above, and the operating method includes: controlling the light shutter to switch between the first state and the second state, and controlling deflection angles of liquid crystal molecules in the first liquid crystal unit and the second liquid crystal unit, thereby controlling brightness of each of the pixel regions.

In some embodiments of the present disclosure, the light shutter and the birefringent filter are added in the liquid crystal display panel, and the light shutter may control polarized light beams having different polarization directions to pass; refractive indices of the birefringent filter to light beams having different polarization directions may be different. Thus, the first polarized light beam having the first polarization direction is emitted along the first path, the second polarized light beam having the second polarization direction is emitted along the second path, and the liquid crystal unit capable of causing the first polarized light beam to be emitted is disposed in the emergent path of the first polarized light beam. A liquid crystal unit capable of causing the second polarized light beam to be emitted is disposed in the emergent path of the second polarized light beam, so that when the light shutter is switched between the states at a higher frequency, the polarized light beams having the two polarization directions may be emitted from the liquid crystal display panel in a display period, so that the liquid crystal display panel outputs more light, thereby improving the transmittance of the liquid crystal display panel. Compared with the related liquid crystal display panel, when the bright-state display is performed, the brightness of the display may be greatly increased, and when the dark-state display is performed, the brightness remains unchanged, and thus the contrast of the liquid crystal display panel may be improved.

Further, the method specifically includes: controlling the light shutter to be in a first state, controlling the first liquid crystal unit to allow the first polarized light beam to pass, so that the first sub-pixel region displays a bright state, and the second sub-pixel region displays a dark state; controlling the light shutter to be in the first state, controlling the first liquid crystal unit to not allow the first polarized light beam to pass, or controlling the light shutter to be in a second state, controlling the second liquid crystal unit to not allow the second polarized light beam to pass, so that the first sub-pixel region displays the dark state, the second sub-pixel region displays the dark state; controlling the light shutter to be in a second state, and controlling the second liquid crystal unit to allow the second polarized light beam to pass, so that the first sub-pixel region displays the dark state, and the second sub-pixel region displays the bright state.

Further, the operating method specifically includes:

(1) controlling the light shutter to be in a first state, controlling the first liquid crystal unit to allow the first polarized light beam to pass, controlling the second liquid crystal unit to allow the second polarized light beam to pass, so that the first sub-pixel region displays the bright state, the second sub-pixel region displays the dark state; or controlling the light shutter to be in the first state, controlling the first liquid crystal unit to allow the first polarized light beam to pass, and controlling the second liquid crystal unit to not allow the second polarized light beam to pass, so that the first sub-pixel region displays the bright state, and the second sub-pixel region displays the dark state;

(2) controlling the light shutter to be in the first state, controlling the first liquid crystal unit to not allow the first polarized light beam to pass, and controlling the second liquid crystal unit to allow the second polarized light beam to pass, so that both the first sub-pixel region and the second sub-pixel region display the dark state; or, controlling the light shutter to be in the first state, controlling the first liquid crystal unit to not allow the first polarized light beam to pass, and controlling the second liquid crystal unit to not allow the second polarized light beam to pass, so that both the first sub-pixel region and the second sub-pixel region display the dark state;

(3) controlling the light shutter to be in the second state, controlling the first liquid crystal unit to allow the first polarized light beam to pass, and controlling the second liquid crystal unit to allow the second polarized light beam to pass, so that the first sub-pixel region displays the dark state, the second sub-pixel region displays the bright state; or, controlling the light shutter to be in the second state, and controlling the first liquid crystal unit to not allow the first polarized light beam to pass, and controlling the second liquid crystal unit to allow the second polarized light beam to pass, so that the first sub-pixel region displays the dark state, and the second sub-pixel region displays the bright state;

(4) controlling the light shutter to be in the second state, controlling the first liquid crystal unit to not allow the first polarized light beam to pass, and controlling the second liquid crystal unit to not allow the second polarized light beam to pass, so that both the first sub-pixel region and the second sub-pixel region display the dark state; or, controlling the light shutter to be in the second state, controlling the first liquid crystal unit to allow the first polarized light beam to pass, and controlling the second liquid crystal unit to not allow the second polarized light beam to pass, so that both the first sub-pixel region and the second sub-pixel region display the dark state.

When the frequency at which the light shutter switches between the first state and the second state is very high, such as when a switching interval is less than a half of a response time of human eye, it may be considered that the light shutter may simultaneously enable the first polarized light beam and the second polarized light beam to pass. When the switching interval of the light shutter is less than a half of a display period, it may be ensured that the polarized light beams having the two polarization directions may be emitted from the liquid crystal display panel in one display period. Since a refresh frequency of the liquid crystal display panel is generally 60 Hz, controlling the light shutter to switch between the first state and the second state specifically includes: controlling the light shutter to switch between the first state and the second state at a frequency exceeding 120 Hz, so as to ensure that the polarized light beams having the two polarization directions may be emitted from the liquid crystal display panel in one display period, so that the liquid crystal display panel may emit more light, thereby improving the light transmittance of the liquid crystal display panel.

The liquid crystal display panel of the present disclosure and the operating method of the liquid crystal display panel are further described below with reference to the accompanying drawings and specific embodiments.

The liquid crystal display panel in some embodiments of the present disclosure includes a plurality of pixel regions, each of which includes a first sub-pixel region and a second sub-pixel region. Each of the pixel regions includes the pixel structure as described above. As shown in FIG. 1, the first sub-pixel region is provided with a color filter layer 61, the second sub-pixel region is not provided with a color filter layer, and only a light transmissive layer 62 is provided for the second sub-pixel region, and light of all colors may be transmitted through the light transmissive layer 62. Optionally, in the second sub-pixel region, the light transmissive layer 62 may also be replaced by a color filter layer which has a same color as that of the color filter layer 61. The present disclosure only provides an example that the second sub-pixel region includes the light transmissive layer 62, and the example that the light transmissive layer 62 is replaced by a color filter layer is also within the protection scope of the present disclosure.

A shape of the first sub-pixel region and a shape of the second sub-pixel region are the same. A shape of the color filter layer 61 and a shape of the light transmissive layer 62 are the same; an area of the first sub-pixel region and an area of the second sub-pixel region are the same, and the area of the color filter layer 61 and the area of the light transmissive layer 62 are also the same.

Figure 2:
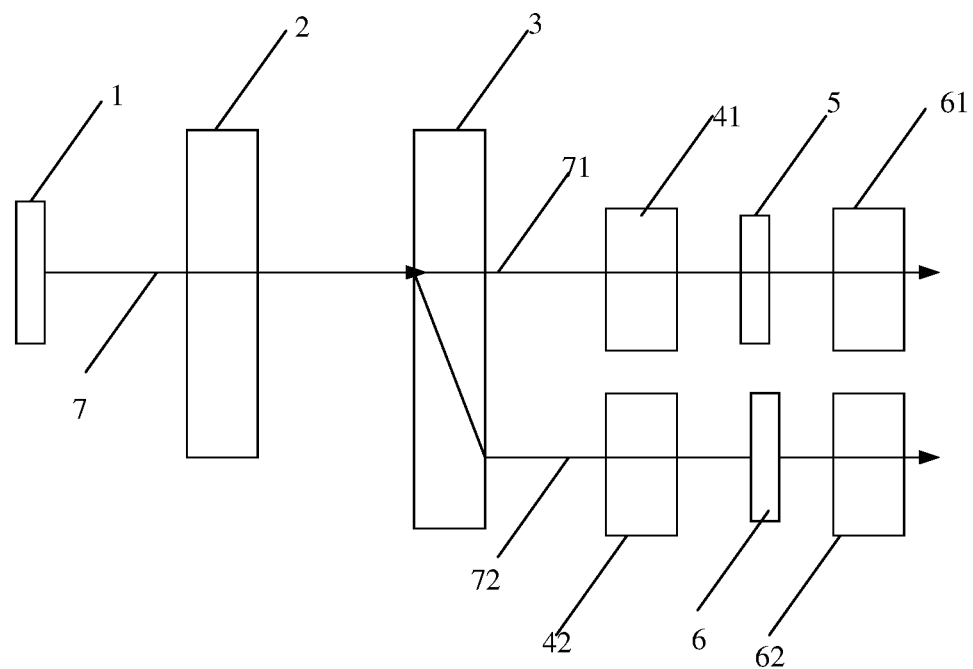
FIG. 2 is a schematic diagram of a light propagation condition of a pixel structure in some embodiments of the present disclosure.

As shown in FIG. 2, a light shutter 2, a birefringent filter 3, a first liquid crystal unit 41, a second liquid crystal unit 42, a first polarizer 5, a second polarizer 6, a color filter layer 61, a light transmissive layer 62 are disposed in a pixel structure of each pixel region of the liquid crystal display panel. In order to ensure sufficient utilization of the incident light, the area of the light shutter 2 is not smaller than the area of the first sub-pixel region. Optionally, the area of the light-emergent opening of the light shutter 2 is equal to the area of the first sub-pixel region, and the birefringent filter 3 is disposed to correspond to the light-emergent opening of the light shutter 2. The area of the birefringent filter 3 is greater than or equal to the area of the first sub-pixel region.

The first liquid crystal unit 41, the first polarizer 5, and the color filter layer 61 are arranged only in the first sub-pixel region, the first polarizer 5 is arranged between the first liquid crystal unit 41 and the color filter layer 61; the second liquid crystal unit 42, the second polarizer 6 and the light transmitting layer 62 are arranged only in the second sub-pixel region.

The light shutter 2 is a TN (Twisted Nematic) type liquid crystal unit. The color filter layer 61 may be a red color filter, a green color filter or a blue color filter.

Figure 3:
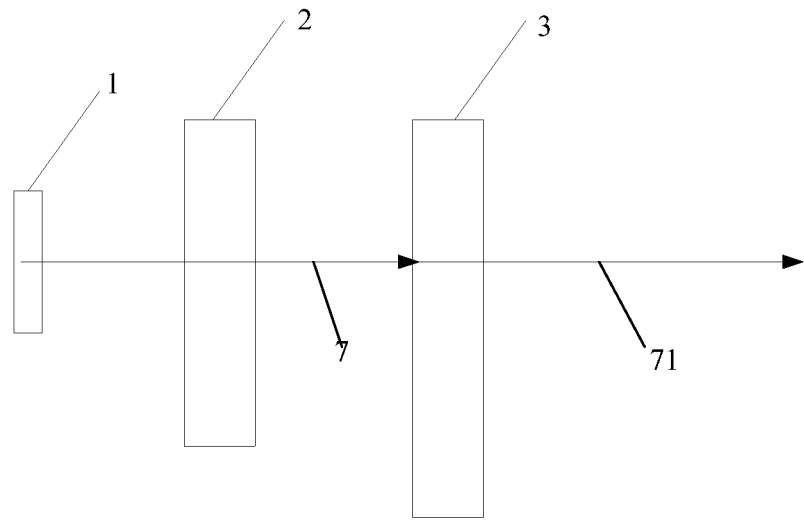
FIG. 3 is a schematic view showing a light shutter in an opened state in some embodiments of the present disclosure.
Figure 4:
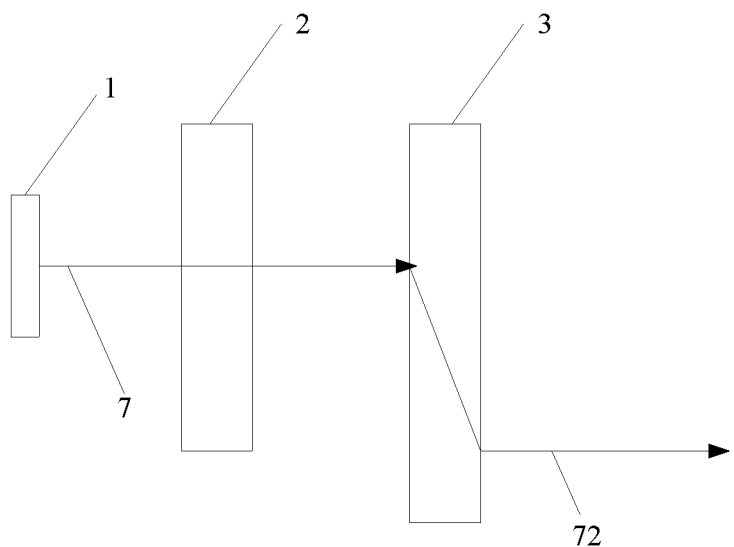
FIG. 4 is a schematic view showing the light shutter in a closed state in some embodiments of the present disclosure.

When white natural light emitted from the backlight source 1 passes through the light shutter 2, as shown in FIGS. 2 and 3, the horizontally polarized light beam 71 may pass through the light shutter 2 and the vertically polarized light beam 72 cannot pass through the light shutter 2 when the light shutter 2 is opened; the horizontally polarized light beam 71 is perpendicularly incident onto the birefringent filter 3, an emergent path of the horizontally polarized light beam is unchanged as compared with the incident path of the white natural light. By adjusting a positional relation between the light shutter 2 and the first liquid crystal unit 41, all of the horizontally polarized light beam 71 emitted from the light shutter 2 may be incident onto the first liquid crystal unit 41, a quantity of the horizontally polarized light beam 71 emergent from the first sub-pixel region may be controlled through the first liquid crystal unit 41. As shown in FIG. 4 and FIG. 2, when the light shutter 2 is closed, the horizontally polarized light beam 71 cannot pass through the light shutter 2, the vertically polarized light beam 72 may pass through the light shutter 2; the vertically polarized light beam 72 is perpendicularly incident onto the birefringent filter 3, and the emergent path of the vertically polarized light beam 72 is shifted by a half of a width of a pixel region and is incident onto the second liquid crystal unit 42. By adjusting a positional relation between the light shutter 2 and the second liquid crystal unit 42, all of the vertically polarized light beam 72 emergent from the light shutter 2 may be incident onto the second liquid crystal unit 42, a quantity of the vertically polarized light beam 72 emergent from the second sub-pixel region may be controlled through the second liquid crystal unit 42.

Figure 5:
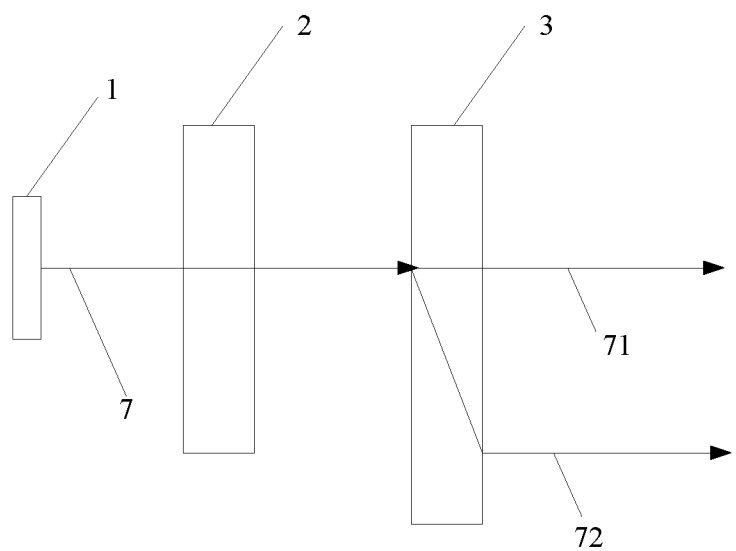
FIG. 5 is a schematic diagram showing high-frequency switching of the light shutter between the opened state and the closed state in some embodiments of the present disclosure.

As shown in FIG. 2 and FIG. 5, when the light shutter 3 is switched between an opened state and a closed state at a very high frequency (for example, at a frequency more than twice of the refresh rate of the liquid crystal display panel), the horizontally polarized light beam 71 and the vertically polarized light beam 72 may simultaneously exit the pixel region in one display period, thereby outputting more light and increasing the light transmittance.

The first liquid crystal unit 41 and the second liquid crystal unit 42 independently control the amount of light emitted from the first sub-pixel region and the second sub-pixel region, respectively.

A first polarizer 5 that allows only the horizontally polarized light beam to pass through may be disposed between the first liquid crystal unit 41 and the color filter layer 61, such that only the horizontally polarized light beam 71 perpendicularly incident onto the first polarizer 5 may pass through the color filter layer 61, and the vertically polarized light beam cannot pass through the color filter layer 61. The second polarizer 6 may or may not be disposed between the second liquid crystal unit 42 and the light transmissive layer 62. In a case that the second polarizer 6 is disposed, only vertically polarized light 72 perpendicularly incident onto the second polarizer 6 may pass through the second polarizer 6, and the horizontally polarized light beam cannot pass through the second polarizer 6.

By controlling states of the light shutter 2, the first liquid crystal unit 41, and the second liquid crystal unit 42, display in the pixel region may be controlled.

Specifically, in a case that the light shutter 2 is in the opened state, the first liquid crystal unit 41 is controlled to allow the horizontally polarized light beam to pass, the second liquid crystal unit 42 is controlled to allow the vertical polarized light beam to pass, and the first sub-pixel region displays the bright state, and the second sub-pixel region displays the dark state, thereby enabling a grayscale display in the pixel region.

In a case that the light shutter 2 is in the opened state, the first liquid crystal unit 41 is controlled to allow the horizontally polarized light beam to pass, the second liquid crystal unit 42 is controlled to not allow the vertical polarized light beam to pass, the first sub-pixel region displays the bright state, and the second sub-pixel region displays the dark state, thereby enabling the grayscale display in the pixel region.

In a case that the light shutter 2 is in the opened state, the first liquid crystal unit 41 is controlled to not allow the horizontally polarized light beam to pass, and the second liquid crystal unit 42 is controlled to allow the vertical polarized light beam to pass, and both the first sub-pixel region and the second sub-pixel region display the dark state, thereby enabling a dark-state display in the pixel region.

In a case that the light shutter 2 is in the opened state, the first liquid crystal unit 41 is controlled to not allow the horizontally polarized light beam to pass, and the second liquid crystal unit 42 is controlled to not allow the vertical polarized light beam to pass through, and both the first sub-pixel region and the second sub-pixel region display the dark state, thereby enabling the dark-state display in the pixel region.

In a case that the light shutter 2 is in the closed state, the first liquid crystal unit 41 is controlled to allow the horizontally polarized light beam to pass, the second liquid crystal unit 42 is controlled to allow the vertical polarized light beam to pass, the first sub-pixel region displays the dark state, and the second sub-pixel region displays the bright state, thereby enabling the grayscale display in the pixel region.

In a case that the light shutter 2 is in the closed state, the first liquid crystal unit 41 is controlled to not allow the horizontally polarized light beam to pass, the second liquid crystal unit 42 is controlled to allow the vertical polarized light beam to pass, the first sub-pixel region displays the dark state, and the second sub-pixel region displays the bright State, thereby enabling the grayscale display in the pixel region.

In a case that the light shutter 2 is in the closed state, the first liquid crystal unit 41 is controlled to allow the horizontally polarized light beam to pass, and the second liquid crystal unit 42 is controlled to not allow the vertical polarized light beam to pass, and both the first sub-pixel region and the second sub-pixel region display the dark state, thereby enabling the dark-state display in the pixel region.

In a case that the light shutter 3 is in the closed state, the first liquid crystal unit 41 is controlled to not allow the horizontally polarized light beam to pass, and the second liquid crystal unit 42 is controlled to not allow the vertically polarized light beam to pass, and bot the first sub-pixel region and the second sub-pixel region display the dark state, thereby enabling the dark-state display in the pixel region.

As described above, by controlling the states of the light shutter 2, the first liquid crystal unit 41, and the second liquid crystal unit 42, the grayscale display and the dark-state display in the pixel region may be realized.

Unless otherwise defined, technical terms or scientific terms used in the present disclosure should have ordinary meanings understood by one of ordinary skills in the art to which the present disclosure belongs. Such words as "first," "second," and the like in the present disclosure do not denote any order, quantity, or importance, but are used to distinguish different components only. Such words as "including" or "comprises" or the like means that an element or an article preceding the word is intended to incorporate elements or articles or the like listed behind the word, without excluding other elements or articles. Such words as "connected" or "connected" and the like are not limited to physical or mechanical connections, but may include electrical connections, whether direct connections or indirect connection. "Upper", "lower", "left", "right", etc. are only used to indicate relative positional relations. When an absolute position of a described object is changed, the relative positional relations may also be changed accordingly.

It will be understood that when an element such as a layer, a film, a region or a substrate is referred as being "on" or "below" another element, the element may be "directly on" or "directly below" the another element, or there may exist intermediate elements.

The above are optional embodiments of the present disclosure, and it should be noted that those skilled in the art may make several improvements and embellishments without departing from the principles of the present disclosure. The improvements and the embellishments should also be considered to be within the scope of the present disclosure.

What is claimed is:

1. A pixel structure applied to a pixel region, comprising:
   a light shutter, configured to switch between a first state and a second state, wherein in the first state, the light shutter only allows first polarized light incident onto the light shutter and having a first polarization direction to pass through the light shutter, and in the second state, the light shutter only allows second polarized light incident onto the light shutter and having a second polarization direction to pass through the light shutter, the first polarization direction being perpendicular to the second polarization direction;
   a birefringent filter, at a light-emergent side of the light shutter and configured to cause an emergent path of the first polarized light perpendicularly incident onto the birefringent filter to be a first path, and to cause an emergent path of the second polarized light perpendicularly incident onto the birefringent filter to be a second path, wherein the first path is different from the second path;
   a first liquid crystal unit and a first color filter at a light-emergent side of the birefringent filter and arranged to correspond to a first sub-pixel region of the pixel region, wherein the first liquid crystal unit is in the first path, and the first color filter is at a light-emergent side of the first liquid crystal unit; and
   a second liquid crystal unit at the light-emergent side of the birefringent filter and arranged to correspond to a second sub-pixel region of the pixel region, wherein the second liquid crystal unit is in the second path.

2. The pixel structure according to claim 1, further comprising:
   a first polarizer, at the light-emergent side of the first liquid crystal unit and configured to allow only the first polarized light to pass; and/or
   a second polarizer, at a light-emergent side of the second liquid crystal unit and configured to allow only the second polarized light to pass.

3. The pixel structure according to claim 1, wherein an area of the first sub-pixel region and an area of the second sub-pixel region are equal.

4. The pixel structure according to claim 1, wherein the first path is consistent with an incident path of the first polarized light, and a distance between the second path and the first path is half of a width of the pixel region.

5. The pixel structure according to claim 1, further comprising:
   a second color filter, at a light-emergent side of the second liquid crystal unit,
   wherein the first color filter and the second color filter allow monochromatic light having a same color to pass; or the first color filter allows monochromatic light to pass, the second color filter allows white light to pass.

6. The pixel structure according to claim 1, wherein an area of a light-emergent opening of the light shutter is greater than or equal to an area of the first color filter; and/or an area of a light-emergent opening of the birefringent filter is greater than or equal to the area of the first color filter.

7. The pixel structure according to claim 1, wherein the light shutter is formed by a Twisted Nematic (TN) type liquid crystal unit.

8. A liquid crystal display panel, comprising:
a plurality of pixel regions, wherein each of the plurality of pixel regions comprises the pixel structure according to claim 1.

9. A display device, comprising:
the liquid crystal display panel according to claim 8; and
a white backlight at a light-incident side of the liquid crystal display panel.

10. A method of operating the liquid crystal display panel according to claim 8, the method comprising:
controlling the light shutter to switch between the first state and the second state, and controlling a deflection angle of a liquid crystal molecule in the first liquid crystal unit and the second liquid crystal unit, so as to control display brightness of each of the plurality of pixel regions.

11. The method according to claim 10, specifically comprising selective control steps that include:
controlling the light shutter to be in a first state and controlling the first liquid crystal unit to allow the first polarized light to pass, so that the first sub-pixel region displays a bright state, and the second sub-pixel region displays a dark state;
controlling the light shutter to be in the first state and controlling the first liquid crystal unit to not allow the first polarized light to pass, or controlling the light shutter to be in a second state and controlling the second liquid crystal unit to not allow the second polarized light to pass, so that the first sub-pixel region displays a dark state, and the second sub-pixel region displays the dark state; and
controlling the light shutter to be in the second state and controlling the second liquid crystal unit to allow the second polarized light to pass, so that the first sub-pixel region displays the dark state, and the second sub-pixel region displays a bright state.

12. The method according to claim 10, specifically comprising selective control steps that include:
controlling the light shutter to be in a first state, controlling the first liquid crystal unit to allow the first polarized light to pass, and controlling the second liquid crystal unit to allow the second polarized light to pass, so that the first sub-pixel region displays a bright state, and the second sub-pixel region displays a dark state;
controlling the light shutter to be in the first state, controlling the first liquid crystal unit to allow the first polarized light to pass, and controlling the second liquid crystal unit to not allow the second polarized light to pass, so that the first sub-pixel region displays the bright state, and the second sub-pixel region displays the dark state;
controlling the light shutter to be in the first state, controlling the first liquid crystal unit to not allow the first polarized light to pass, and controlling the second liquid crystal unit to allow the second polarized light to pass, so that both the first sub-pixel region and the second sub-pixel region display the dark state;
controlling the light shutter to be in the first state, controlling the first liquid crystal unit to not allow the first polarized light to pass, and controlling the second liquid crystal unit to not allow the second polarized light to pass, so that both the first sub-pixel region and the second sub-pixel region display the dark state;
controlling the light shutter to be in a second state, controlling the first liquid crystal unit to allow the first polarized light to pass, and controlling the second liquid crystal unit to allow the second polarized light to pass, so that the first sub-pixel region displays the dark state and the second sub-pixel region displays a bright state;
controlling the light shutter to be in the second state, controlling the first liquid crystal unit to allow the first polarized light to pass, and controlling the second liquid crystal unit to not allow the second polarized light to pass, so that both the first sub-pixel region and the second sub-pixel region displays the dark state;
controlling the light shutter to be in the second state, controlling the first liquid crystal unit to note allow the first polarized light to pass, and controlling the second liquid crystal unit to allow the second polarized light to pass, so that the first sub-pixel region displays the dark state and the second sub-pixel region displays the bright state; and
controlling the light shutter to be in the second state, controlling the first liquid crystal unit to not allow the first polarized light to pass, and controlling the second liquid crystal unit to not allow the second polarized light to pass, so that both the first sub-pixel region and the second sub-pixel region displays the dark state.

13. The method according to claim 10, wherein controlling the light shutter to switch between the first state and the second state comprises:
controlling the light shutter to switch between the first state and the second state at a frequency larger than 120 Hz.

* * * * *